US012703418B2

(12) United States Patent
Wilkes

(10) Patent No.: US 12,703,418 B2
(45) Date of Patent: Aug. 11, 2026

(54) STEERING ASSEMBLY FOR A VEHICLE

(71) Applicant: ZF Automotive UK Limited, Solihull (GB)

(72) Inventor: Mark Anthony Wilkes, Kings Norton (GB)

(73) Assignee: ZF Automotive UK Limited, Solihull (GB)

( * ) Notice: Subject to any disclaimer, the term of this patent is extended or adjusted under 35 U.S.C. 154(b) by 358 days.

(21) Appl. No.: 18/441,019

(22) Filed: Feb. 14, 2024

(65) Prior Publication Data

US 2024/0270304 A1 Aug. 15, 2024

(51) Int. Cl.
*B62D 5/00* (2006.01)

(52) U.S. Cl.
CPC .................................... *B62D 5/006* (2013.01)

(58) Field of Classification Search
CPC .......... B62D 5/005; B62D 5/06; B62D 5/065; B62D 5/001; B62D 5/0409; B62D 1/16; B62D 5/04; B60T 2260/02; F16F 15/161; F16F 9/12
See application file for complete search history.

(56) References Cited

U.S. PATENT DOCUMENTS 4,352,304 A * 10/1982 Warner .................... B62D 7/22 188/290
4,503,952 A * 3/1985 Hesse .................... B60G 13/08 192/58.41
4,899,854 A * 2/1990 Cartoni .................... F16F 9/12 188/290
5,301,775 A * 4/1994 Nedbal .................... F16F 9/12 188/290

(Continued)

FOREIGN PATENT DOCUMENTS

DE 10016650 C1 * 9/2001 ............. F16M 11/18
DE 60014515 T2 * 10/2005 ................ F16F 9/12

(Continued)

*Primary Examiner* — John Olszewski
*Assistant Examiner* — Matthew D Lee
(74) *Attorney, Agent, or Firm* — Kristin L. Murphy

(57) ABSTRACT

A steering assembly for a steer-by-wire vehicle comprises a rotatably mounted steering column configured for attachment of a steering member at one end, the steering column being rotatable about its longitudinal axis. The steering assembly further comprises a damper having a housing defining a volume for receipt of damping fluid; a rotor within the housing, the rotor being coupled with the steering column and rotatable therewith; a stator mounted within the housing, the stator being moveable within the housing within a defined range of movement; and a biasing arrangement acting on the stator. Each of the stator and rotor comprises a shear surface, the shear surfaces of the stator and the rotor being positioned adjacent one another to generate a resistance to rotation of the rotor when the housing contains damping fluid. Furthermore, the total surface area of the shear surfaces of the stator and the rotor positioned adjacent one another which generates the resistance to rotation of the rotor varies as the steering column is rotated from the straight ahead position by virtue of displacement of the stator relative to the rotor.

32 Claims, 5 Drawing Sheets

(56) References Cited

U.S. PATENT DOCUMENTS

| | | | | |
|---|---|---|---|---|
| 6,041,899 | A * | 3/2000 | Takamatsu | F16F 9/12 188/290 |
| 10,267,375 | B2 * | 4/2019 | Muranaka | F16F 9/12 |
| 2007/0045982 | A1 * | 3/2007 | Tomonaga | B62K 21/08 188/290 |
| 2018/0109061 | A1 * | 4/2018 | Pardhan | G01S 7/4813 |
| 2021/0188352 | A1 * | 6/2021 | Galehr | B62D 7/224 |
| 2022/0037947 | A1 | 2/2022 | Takahashi | |
| 2024/0270302 | A1 * | 8/2024 | Wilson-Jones | B62D 5/043 |

FOREIGN PATENT DOCUMENTS

| | | | | |
|---|---|---|---|---|
| DE | 102010049928 | A1 * | 5/2011 | F16F 9/53 |
| FR | 2573829 | A1 * | 5/1986 | F16F 9/12 |
| GB | 2087513 | A * | 5/1982 | F16F 9/12 |
| JP | 2011231868 | A * | 11/2011 | |
| JP | 5590376 | B2 * | 9/2014 | |
| KR | 102375489 | B1 | 3/2022 | |
| SU | 1084507 | A2 * | 4/1968 | F16F 9/12 |
| WO | 2022081946 | A1 | 4/2022 | |

* cited by examiner

STEERING ASSEMBLY FOR A VEHICLE

CROSS-REFERENCE TO RELATED APPLICATION

This application claims priority to GB Priority Application No. 2302114.0, filed Feb. 14, 2023, the disclosure of which is incorporated herein by reference in its entirety.

TECHNICAL FIELD

This disclosure relates to steering assemblies for vehicles and to motor vehicles comprising such steering assemblies. More specifically, although not exclusively, this disclosure relates to steering assemblies for use in steer-by-wire vehicles.

BACKGROUND

Traditional vehicle steering systems utilise a constant mechanical connection between the steering wheel and the steered wheels. However, the trend towards steer-by-wire steering systems breaks the traditional mechanical connection and replaces it with a digital control signal. Specifically, a steering input is applied through a steering wheel. A signal is transmitted to a steering axle actuator in dependence on the steering input, controlling motion of the steering rack and the degree to which the steered wheels are pivoted.

In a traditional steering system, a steering assistance unit may reach a power limit when the steering wheel is turned at high speed. This condition is sometimes called "catch-up". In this condition, the maximum assistance torque is limited, and the driver perceives an increase in torque feedback through the steering wheel. This tends to reduce the maximum rotational speed of the steering wheel that the driver can achieve.

In steer-by-wire steering systems, due to the absence of constant mechanical connection between the steering wheel and the steered wheels, the steering wheel can be rotated at a high speed and the driver does not perceive an increase in torque feedback. Consequently, it may be the case that the steering actuator does not have sufficient power to meet the driver's steering demand. The problem may be further exacerbated by many steer-by-wire systems due to reduced angular travel of the steering wheel, making it easier for the driver to turn from lock-to-lock quickly.

Due to the absence of a mechanical connection between the steering wheel and steering rack in steer-by-wire steering systems, it is often desired to provide a feedback torque to the steering wheel in the opposite direction to the steering input. One way in which feedback torque can be achieved is via a damper, e.g. a viscous damper, which may provide a simple, passive arrangement for generating a feedback torque. This may be provided either alone, or in addition to a torque feedback motor.

It would be advantageous to provide a damper in which the amount of feedback torque applied to the steering wheel is increased as the speed of rotation of the steering wheel is increased, or beyond a threshold rotational speed of the steering wheel. This may allow the maximum rotational speed of the steering wheel to be limited or regulated, thereby reducing the likelihood of a steering actuator failing to meet a driver's steering demand.

SUMMARY

It has been found that the aforementioned issues may be overcome by providing a damper in which the total surface area subject to viscous coupling by damping fluid is varied with the rotational speed of the steering wheel.

In accordance with the present disclosure, a steering assembly for a steer-by-wire vehicle comprises:

- a rotatably mounted elongate steering column configured for attachment of a steering member at one end, the steering column being rotatable about its longitudinal axis in either direction from a straight ahead position;
- a damper comprising:
- a housing defining a volume for receipt of damping fluid;
- a rotor within the housing, the rotor being coupled with the steering column and rotatable therewith;
- a stator mounted within the housing, the stator being moveable within the housing within a defined range of movement; and
- a biasing arrangement acting on the stator;
- wherein each of the stator and rotor comprises a shear surface, the shear surfaces of the stator and the rotor being positioned adjacent one another to generate a resistance to rotation of the rotor when the housing contains damping fluid; and
- a total surface area of the shear surfaces of the stator and the rotor positioned adjacent one another which generates the resistance to rotation of the rotor varies as the steering column is rotated from the straight ahead position by virtue of displacement of the stator relative to the rotor.

A variation in the total area of shear surfaces of the rotor and the stator positioned adjacent one another provides a variation in the resistance to rotation of the rotor. As the rotor is rotated with the steering shaft, the damping fluid located between the adjacent shear surfaces is sheared, and a drag force is applied to the rotor.

Therefore, by varying the total area of adjacent shear surfaces with displacement of the stator relative to the rotor, the amount of drag on the rotor, and therefore feedback torque, can also be varied with the position of the stator. As such, an improved feedback torque profile can be achieved.

In an exemplary arrangement, the total surface area of the shear surfaces of the stator and the rotor positioned adjacent one another is increased as the steering column is rotated from the straight ahead position.

In an exemplary arrangement, the total surface area of the shear surfaces of the stator and the rotor positioned adjacent one another is decreased as the steering column is rotated from the straight ahead position.

In an exemplary arrangement, the total surface area of the shear surfaces of the stator and the rotor positioned adjacent one another is increased or decreased as the when the rotational speed of the steering column exceeds a predetermined threshold.

Therefore, by varying the total area of adjacent shear surfaces with rotational speed of the steering column, the amount of drag on the rotor, and therefore feedback torque or resistive torque, can also be varied with the rotational speed of the steering column. As such, in the case of steer-by-wire steering systems it may be possible to prevent issues with excessive rotational speed by providing greater feedback torque or resistive torque when a predetermined rotational speed is exceeded.

In an exemplary arrangement, the stator is rotatable about the longitudinal axis of the steering column.

The stator may be arranged or configured to be displaced against the biasing arrangement axially towards the rotor as it is rotated.

In an exemplary arrangement, the stator is rotatable within the housing, and the stator and rotor are coupled by the damping fluid, such that the stator is rotated relative to the housing and/or the rotor when the steering column is rotated at a speed greater than a predetermined threshold.

In an exemplary arrangement, the stator comprises a cam, and the steering assembly comprises a cam follower fixed relative to the housing. The cam and cam follower may be arranged or configured so as to displace the stator axially towards the rotor against the biasing means as the cam follower is moved along the cam.

The cam may be configured to rotate with the stator and may comprise a cam surface. The position of the cam surface along the longitudinal axis may vary along the length of the cam. The cam surface may comprise a groove and/or an abutment surface. The cam may be connected to or attached to the stator. The cam may be formed integrally with the stator.

The cam may be formed in the stator, e.g. an external surface of the stator, and may comprise a groove defining an abutment surface or an engagement surface. The position of the abutment surface or the engagement surface along the longitudinal axis may vary along the length of the cam.

The cam, abutment surface or cam surface may be curved, arcuate or part-annular.

The cam may be coaxial with the longitudinal axis of the steering column.

The cam and cam follower may be arranged or configured such that the cam follower is moved along the cam and the stator is displaced axially towards the rotor against the biasing arrangement as the stator is rotated relative to the housing and/or rotor.

The biasing arrangement may be located or positioned between the stator and the rotor. The biasing arrangement may be arranged or configured so as to bias the cam into contact with the cam follower.

In an arrangement, the biasing arrangement comprises a compression spring. The biasing arrangement or compression spring may be configured to bias the stator away from the rotor.

The biasing force, e.g. of the biasing arrangement or compression spring, may increase as the stator is displaced axially towards the rotor.

The cam and the cam follower may be arranged or configured so as to displace the stator axially towards the rotor against the biasing arrangement when the rotational speed of the steering column exceeds a predetermined threshold, e.g. as the stator and the rotor are coupled by the damping fluid.

The biasing arrangement may be located between the stator and the housing.

The stator and/or the rotor may comprise a respective elongate projection extending therefrom. Each elongate projection may comprise a respective shear surface.

In an arrangement, the elongate projection of the stator extends towards the rotor and/or the elongate projection of the rotor extends towards the stator.

Each elongate projection may be arcuate. At least one shear surface of each elongate projection may comprise an annular shear surface. The total area of annular shear surfaces positioned adjacent one another may be increased as the steering column is rotated from the straight ahead position or the stator is rotated, e.g. relative to the rotor or housing.

The total area of annular shear surfaces positioned adjacent one another may be increased as the stator is displaced against the biasing arrangement axially towards the rotor.

The stator and the rotor may each comprise a plurality of radially spaced elongate projections and one or more passages described between adjacent elongate projections. An elongate projection of the stator may be configured to be received within a passage of the rotor. An elongate projection of the rotor may be configured to be received within a passage of the stator.

The amount by which the elongate projections of the stator axially overlap the elongate projections of the rotor may be increased as the stator is displaced against the biasing arrangement axially towards the rotor, thereby increasing the total surface area of the shear surfaces positioned adjacent one another.

One or more of the elongate projections may comprise a slot or aperture configured to facilitate the transfer or movement of damping fluid across the elongate projection. The slot or aperture may be configured to facilitate the transfer or movement of damping fluid between adjacent passages.

The shear surface of the stator and/or the rotor may be planar.

The shear surface of the stator may be spaced from the shear surface of the rotor, e.g. along the longitudinal axis of the steering column.

The shear surface of the stator may be configured to be displaced axially against the biasing arrangement, e.g. towards the shear surface of the rotor.

In an arrangement, the shear surfaces overlap when viewed along the longitudinal axis of the steering assembly.

The stator may be rotatable within the housing. The stator may be rotatable relative to the housing and/or rotor. Additionally, or alternatively, the stator may be mounted eccentrically, e.g. within the housing or relative to the steering column.

The stator and the rotor may be arranged such that spacing, e.g. the minimum spacing, between the shear surface of the elongate projection of the stator and the shear surface of the elongate projection of the rotor varies as the steering column is rotated from the straight ahead position.

The stator and the rotor may be arranged such that the spacing, e.g. the minimum spacing, between the shear surface of the elongate projection of the stator and the shear surface of the elongate projection of the rotor is reduced as the steering column is rotated from the straight ahead position.

The stator and rotor may be coupled by the damping fluid, such that the stator is rotated when the steering column is rotated at a speed greater than a predetermined threshold.

The spacing between the shear surfaces may be reduced as the stator is rotated thereby increasing the total surface area of shear surfaces positioned adjacent one another.

The spacing between the shear surfaces may be reduced as the stator is rotated thereby reducing the separation distance of at least some of the shear surfaces positioned adjacent one another.

The biasing arrangement may be configured to bias the stator towards a neutral or straight ahead position.

The steering assembly may comprise a pair of circumferentially spaced end stops. The end stops may be configured to limit the extent of rotation of the stator. The stops may be positioned or located either side of the straight ahead position.

A further aspect of the disclosure provides steering column assembly comprising a steering assembly as described above.

A further aspect of the disclosure provides a vehicle comprising a steering assembly as described above or a steering column assembly as described above.

For the avoidance of doubt, any of the features described herein apply equally to any aspect of the disclosure.

Another aspect of the disclosure provides a computer program element comprising and/or describing and/or defining a three-dimensional design for use with a simulation device or a three-dimensional additive or subtractive manufacturing device, e.g. a three-dimensional printer or CNC machine, the three-dimensional design comprising an arrangement of the steering assembly described above.

Within the scope of this application it is expressly intended that the various aspects, arrangements, examples and alternatives set out in the preceding paragraphs, in the claims and/or in the following description and drawings, and in particular the individual features thereof, may be taken independently or in any combination. That is, all arrangement and/or features of any arrangement can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

Exemplary arrangements of the disclosure will now be described by way of example only with reference to the accompanying drawings in which.

DETAILED DESCRIPTION

Figure 1:
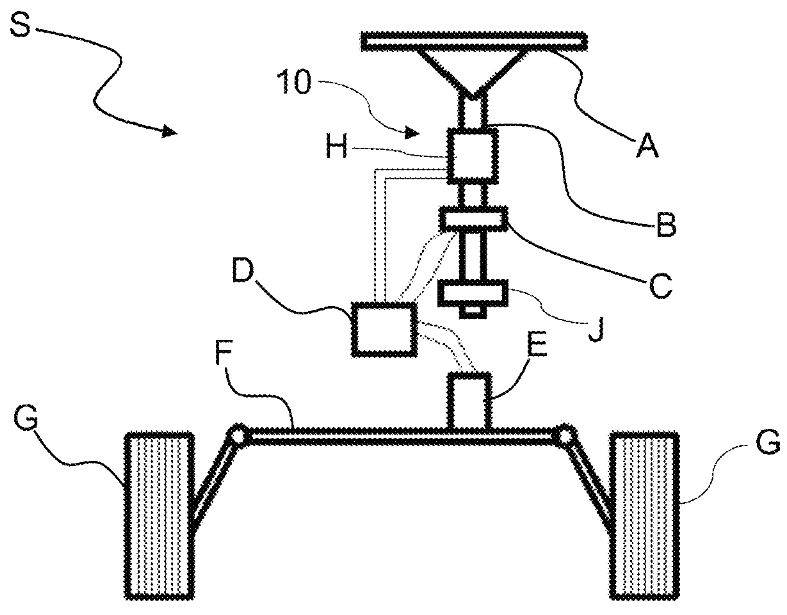
FIG. 1 is a schematic illustration of a steer-by-wire steering system in accordance with the present disclosure.

FIG. 1 illustrates a steer-by-wire system S for a vehicle incorporating a steering assembly 10 in accordance with the present disclosure. The steer-by-wire system S includes a handwheel actuator, in the form of a steering wheel A, to allow a driver of the vehicle to provide an input steering command. The steering wheel A is connected to an end of an elongate steering shaft B.

A steering input applied through the steering wheel A is measured by a steering sensor forming part of the steering column assembly, shown schematically at C in FIG. 1. A signal representative of the steering input (i.e. the rotation of the steering wheel A and steering shaft B) is transmitted from the sensor C to an electronic control unit (ECU) D which, in turn, controls a steering axle actuator E. The steering axle actuator E applies the steering input to the steering axle F, and therefore steers the steered wheels G as a function of the rotational position of the steering wheel A.

The electronic control unit D is also configured to supply a current to a torque feedback motor H connected to the shaft B and which applies a torque in the opposite direction to the torque applied at the steering wheel A in order to provide a sensation of "road feel" to the driver.

A damper J, described in greater detail below, is connected to the steering shaft B at a location distal from the steering wheel A. The damper J is a passive, viscous damper in this embodiment, and introduces a feedback torque to the steering wheel A when a steering input is applied. Whilst FIG. 1 illustrates the damper J mounted part way along the steering shaft B, i.e. between the ends of the steering shaft B such that the steering shaft B passes through the damper J, this need not be the case. Instead, the damper J may be mounted or located at the end of the steering shaft B remote from the steering wheel A.

Figure 2:
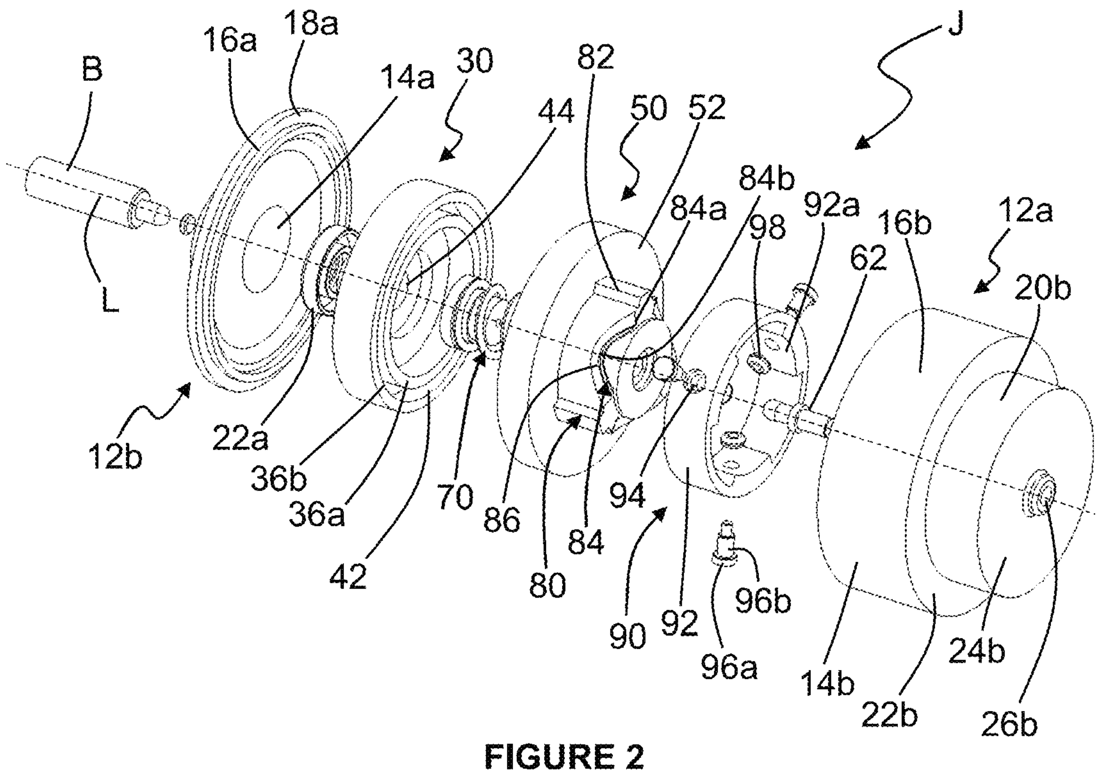
FIG. 2 is an exploded view of a damper forming part of a steering assembly for a steer-by-wire vehicle in accordance with the present disclosure.
Figures 3, 4:
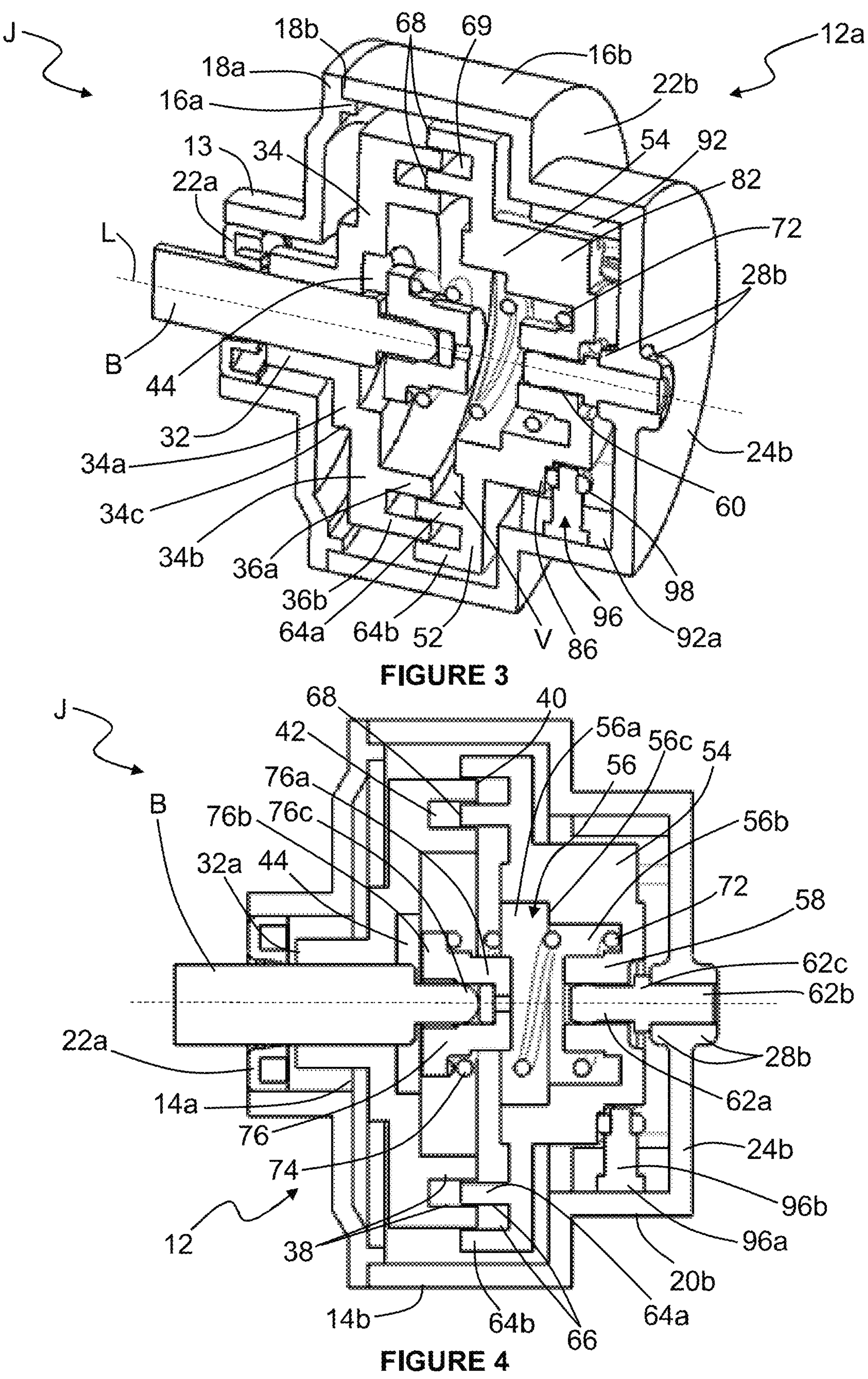
FIG. 3 is a perspective cross-sectional view of the arrangement of FIG. 2 taken through the longitudinal axis of the steering shaft.
FIG. 4 is a side cross-sectional view of the arrangement of FIG. 2 taken through the longitudinal axis of the steering shaft.

FIGS. 2 to 4 illustrate a first exemplary arrangement of damper J forming part of a steering assembly 10 (FIG. 1) for a steer-by-wire vehicle, wherein the damper J is mounted at the end of a steering shaft B. The arrangement of FIGS. 2 to 4 is shown in a minimal feedback torque or resistive torque condition.

The damper J includes a housing 12 defining an internal volume. The housing 12 encloses a rotor 30 that is coupled to the steering shaft B and is rotatable therewith, and a stator 50 that is mounted in the housing 12 but displaceable axially and rotatably by predetermined amounts relative to the housing 12 and the rotor 30. The stator 50 is displaceable against a compression spring 70, mounted coaxially with the longitudinal axis L of the steering shaft B and extending between the rotor 30 and the stator 50, by virtue of three cam surfaces 86 provided on a cylindrical hub portion 54 of the stator 50 and engaged with cam followers 98 of a cam follower assembly 90 fixedly mounted within the housing 12, as will be explained. A damping fluid V, in the form of a silicone fluid (e.g. a silicone oil) in this exemplary arrangement, is contained within the housing 12 and is arranged between and around the rotor 30 and stator 50. Each of the rotor 30 and stator 50 are annular when viewed along the longitudinal axis L of the steering shaft B, and the rotor 30 surrounds the end of the steering shaft B. 1019 north maple street As is described in greater detail hereinafter, in use, as the steering shaft B is rotated, e.g. in response to a steering input applied through the steering wheel A (FIG. 1), the rotor 30 is rotated therewith and rotates relative to the stator 50. As a result of its viscosity, the damping fluid V provides a coupling between the movement of the rotor 30 and the stator 50. Therefore, as the rotor 30 is rotated it applies a tangential force to the damping fluid V, causing it to rotate around the housing 12 and thereby applying a resultant tangential force to the stator 50. If the force applied to the stator 50 by the damping fluid V exceeds a predetermined threshold, the stator 50 is rotated causing it to be displaced axially towards the rotor 30 by virtue of engagement between the cam hub 80 and cam follower assembly 90.

As will be described in greater detail hereinafter, as the stator 50 is displaced axially towards the rotor 30 the total area of shear surfaces of the rotor 30 and stator 50 positioned adjacent one another is increased. As will be described in further detail below, the amount of drag is dependent on the total area of shear surfaces positioned adjacent one another as this has an impact on the amount of shearing of the damping fluid V. This increases the amount of drag applied to the rotor 30, by virtue of the damping fluid V, and provides an increase in the feedback torque or resistive torque applied to the rotor 30, and therefore to the steering shaft B. It will be appreciated that the greater the rotational speed of the rotor 30, the greater the movement of the damping fluid V and resultant tangential force applied to the stator 50. As a result, the described arrangement provides a relationship between the rotational speed of the steering shaft B and therefore rotor 30, and the feedback torque or resistive torque applied thereto.

Looking at the described arrangement in greater detail, the housing 12 has a cup-shaped main body portion **12*a* and an end cap 12*b* releasably and sealingly secured to the main body portion 12*a*, in use. A tubular sleeve 13, arranged coaxially with the longitudinal axis L, extends perpendicularly from the outer face of the end cap 12*b* and defines a passageway 14*a* through which an end of the steering shaft B passes. The end cap 12*b* also has an annular retaining rib 16*a* and a radial ledge 18*a* at the periphery of its inner face, for sealing engagement with the end of the main body portion 12*a*. For example, and as shown in FIGS. 3 and 4, the annular retaining rib 16*a* is positioned radially inward of, and in sealing contact with, a sidewall 16*b* of the main body portion 12*a* and the radial ledge 18*a* sealingly abuts the annular free end 18*b* of the main body portion 12*a*. An annular bushing 22*a* is mounted between the steering shaft B and the tubular sleeve 13 to facilitate rotation of the steering shaft B with respect to the housing 12 and to prevent the escape of damping fluid V and/or the ingress of foreign material into the housing 12. The bushing 22*a*** is held in place by a retaining means, e.g. a circlip (not shown).

The main body portion **12*a* of the housing 12 is generally cup-shaped, having a first cylindrical portion 14*b* defined by the side wall 16*b*, and a second cylindrical portion 20*b* having a diameter less than the first cylindrical portion 14*b*. A radial shoulder 22*b* is defined between the first and second cylindrical portions 14*b*, 20*b*. An integrally formed end plate 24*b* is provided at the axially outer end of the second cylindrical portion 20*b* and has an aperture 26*b* extending therethrough, coaxially with the axis L. The portions of the inner and outer faces of the end plate 24*b* located immediately radially outward of the aperture 26*b* are of increased thickness, forming a cylindrical sleeve portion 28*b* which is configured to receive an end of a mounting pin 62 of the stator 50**, described in greater detail below.

The rotor 30 has a tubular mounting collar 32 for receipt of and connection with the steering shaft B and an annular base plate 34 extending radially from the mounting collar 32 and steering shaft B. The mounting collar 32 is received within the tubular sleeve 13 of the housing 12 and is mounted coaxially therewith. A free end of the mounting collar **32*a* is positioned adjacent the bushing 22*a***.

The base plate 34 has a stepped profile, having a radially inner region **34*a* and a radially outer region 34*b* extending therefrom and separated by a step 34*c*. The collar 32 and base plate 34 are mounted coaxially with the longitudinal axis L of the steering shaft B. The rotor 30 may either be formed of a unitary annulus or ring or may instead be formed of a pair of half annuli connected together. Extending perpendicularly from the axially inner face of the radially outer region 34*b* of the base plate 34 are a pair of annular vanes 36*a*, 36*b*, comprising a radially inner vane 36*a* and a radially outer vane 36*b* located radially outward of the radially inner vane 36*a*. Each of the vanes 36*a*, 36*b* is planar and rectangular in cross-section, is mounted coaxially with the base plate 34 and extends substantially parallel to the longitudinal axis L of the steering shaft B towards the stator 50**.

The inner and outer walls of each of the vanes **36*a*, 36*b* form radially inner and outer annular shear surfaces 38. The end face of each of the vanes 36*a*, 36*b* also forms a further annular shear surface 40. The shear surfaces 38, 40 are arranged to act with corresponding shear surfaces of the stator 50 and the damping fluid V to provide damping to the steering shaft B, as described in greater detail below. An annular passage 42 is also defined between the vanes 36*a*, 36*b* and has a width, defined in a radial direction, greater than the width of each of the vanes 36*a*, 36*b*. The axially inner face of the base plate 34 is also formed into an annular recess 44 immediately radially outwardly of the central aperture 14**.

The stator 50 has an annular base plate 52 extending radially outwardly from the axially inner end of a cylindrical hub portion 54 arranged coaxially with the axis L. In a similar manner to the rotor 30, the stator 50 may either be formed of a unitary annulus or ring or may instead be formed of a pair of half annuli connected together. The centre of the axially inner face of the annular base plate 52 and cylindrical hub portion 54 (i.e. the centre of the face which opposes the rotor 30) are formed into a stepped recess 56 for receipt of a portion of the compression spring 70. The stepped recess 56 is formed from a first, axially inner circular portion **56*a* and a second, axially outer circular portion 56*b* of a smaller diameter than the first circular portion 56*a* and extending between the first portion 56*a* and into the cylindrical hub portion 54. The first and second portions 56*a*, 56*b* of the stepped recess 56 are separated by a radial ledge 56*c*. The axially outer portion 56*b* of the stepped recess 56 defines a cylindrical collar 58 in the axially inner base of the cylindrical hub portion 54 which is arranged coaxially with the axis L and has a longitudinally-extending through aperture 60. The aperture 60 receives a first end 62*a* of a mounting pin 62. The mounting pin 62 has a second end 62*b* received within the aperture 26*b* of the end plate 24*b*. The mounting pin 62 also has a radially extending flange 62*c* between the first and second ends 62*a*, 62*b* that abuts both the end of the cylindrical hub portion 54 and the cylindrical sleeve 28*b* surrounding the aperture 26*b*. The mounting pin 62 allows both rotational and axial displacement of the stator 50 relative to the housing 12**, as will be explained.

Extending perpendicularly from the axially inner face of the annular base plate 52 of the stator 50 is a pair of annular vanes, including a radially inner vane **64*a* and a radially outer vane 64*b* located radially outward of the radially inner vane 64*a*. The vanes 64*a*, 64*b* are planar and rectangular in cross-section and are arranged coaxially with the longitudinal axis L of the steering shaft B and extend substantially parallel thereto towards the rotor 30 The radially inner and outer faces of the vanes 64*a*, 64*b* form radially inner and outer annular shear surfaces 66. The end face of each of the vanes 64*a*, 64*b* also forms a further annular shear surface 68. An annular passage 69 is also defined between the vanes 64*a*, 64*b* and into which the radially outer vane 36*b*** of the rotor is received.

A slot or aperture (not shown) may be provided in one or each of the vanes 36*a*, 36*b* in order to provide an additional path for the damping fluid V to flow to and from the annular passage 42. Similarly, a slot or aperture may be provided in one or each of the vanes 64*a*, 64*b* in order to provide an additional path for the damping fluid V to flow to and from the annular passage 69. The size of the apertures may be adjusted or varied to vary the dynamic response of the damper.

In the described arrangement, the radially inner vane 64*a* is received within the annular passage 42 between the radially inner and outer vanes 36*a*, 36*b* of the rotor 30. The radially outer vane 64*b* is received between a radially outer annular shear surface 38 of the radially outer vane 36*b* of the rotor 30 and an inner surface of the second end portion 12*b* of the housing 12.

The vanes 36*a*, 36*b*, 64*a* and 64*b* of the rotor 30 and stator 50 overlap fit between each other. The annular shear surfaces 38 and 66 of the rotor 30 and stator 50 are positioned adjacent to but spaced apart from one another and define a gap of constant width therebetween. Further, the annular shear surfaces 40 at the ends of the rotor vanes 36*a*, 36*b* are positioned adjacent the annular base plate 52 of the stator 50 and the annular shear surface 68 at the end of the radially inner stator vane 64*a* is positioned adjacent the base plate 34 of the rotor 30 and in each case a gap is defined therebetween.

The compression spring 70 is located between the rotor 30 and the stator 50 and is arranged to bias the rotor 30 and stator 50 away from one another such that the cam surfaces 86 of the cam hub 80 are in contact with the followers 98 of the cam follower assembly 90, as will be explained. A first end 72 of the spring 70 is received within the stepped recess 56 of the moveable stator 50, and in one exemplary arrangement, the second annular portion 56*b*, and extends around, but is spaced from the collar 58. A second end 74 of the spring 70 is engaged with a bushing 76 having a generally cylindrical body 76*a* and a flange 76*b* extending from a free end thereof. The bushing 76 has a recess 76*c* within which an end of the steering shaft B is rotatably received. The flange 76*b* is arranged to be seated within the annular recess 44 in the base plate 34 of the rotor 30 and the second end 74 of the spring 70 abuts a shoulder of the flange 76*b*.

The cam surfaces 86 are provided on the axially outer surface of the cylindrical hub portion 54 of the stator 50 (i.e. the surface which does not oppose the rotor 30) and includes three identical, equally circumferentially spaced profiled cam surfaces 86 separated by longitudinally extending lugs 82. Each cam surface 86 has a pair of ends 84*a* located axially proximate the base of the cylindrical hub portion 54. The cam surfaces 86 extend between the ends 84*a* in the direction of the rotor 30 to a rounded or curved apex 84*b*. The cam hub 80 is mounted within the second cylindrical portion 20*b* of the main body portion 12*a* of the housing 12.

The cam follower assembly 90 is also seated within the second cylindrical portion 20*b* of the main body portion 12*a* of the housing 12 and includes a cam follower mounting ring 92 that is positioned radially outward of the cylindrical hub portion 54 of the stator 50. The mounting ring 92 has a radially inner annular surface facing the cylindrical hub portion 54 and a radially outer annular surface facing an internal wall of the second cylindrical portion 20*b* of the main body portion 12*a* of the housing 12. The radially inner annular surface includes three identical, equally circumferentially spaced raised portions having increased thickness, hereinafter referred to as lugs 92*a*.

A countersunk aperture 94 extends through the mounting ring 92 and through each of the lugs 92*a*, wherein each aperture 94 is countersunk into the radially outer annular surface of the mounting ring 92. Each countersunk aperture 94 receives a respective cam follower mounting pin 96 that projects from the radially inner annular surface of the mounting ring 92. Each cam follower mounting pin 96 has an enlarged head 96*a* that is received within the countersunk portion of each countersunk aperture 94, such that it sits generally flush with the radially outer annular surface of the mounting ring 92.

Each cam follower mounting pin 96 also has a shank portion 96*b* passing through its associated aperture 94 in the mounting ring, on the inner free end of which a cam follower roller 98 is rotatably mounted and engages the associated cam surface 86 of the cam hub 80.

In the condition shown in FIGS. 2 to 4 each respective cam follower mounting pin 96, and therefore cam follower roller 98, is aligned with, and in contact with, a rounded or curved apex 84*b* of the associated cam surface 86. In this condition, overlap between vanes 36*a*, 36*b*, 64*a* and 64*b* of the rotor 30 and stator 50 in the direction of the longitudinal axis L is at a minimum such that the total area of shear surfaces positioned adjacent one another is at a minimum. As a result, and as outlined above, the feedback torque or resistive torque applied to the rotor 30 is at a minimum in this condition.

In use, as the rotor 30 is rotated with the steering shaft B, the damping fluid V located proximate the shear surfaces 38, 40 is sheared and is moved relative to the stator 50. Due to its viscosity, the moving damping fluid V imparts a force to the stator 50 and as the rotational speed of the rotor 30 is increased, the force imparted to the stator 50 by the damping fluid V is also increased. However, in order to move the stator 50 towards the rotor 30 and thereby increase damping, the stator 50 must be rotated such that each of the cam follower rollers 98 is moved along the associated cam surface 86 of the cam hub 80 away from the curved apex 84*b* and towards one of the ends 84*a*, and such that the force applied to the stator 50 by the camming action overcomes the biasing force of the compression spring 70. Whilst the rotational speed of the rotor 30 is below a predetermined threshold, the force imparted to the stator 50 by the damping fluid V is less than that required to both overcome the biasing force of the compression spring 70 and allow the stator 50 to rotate by causing the cam followers 96 to move away from the curved apex 84*a* of the associated abutment surfaces 86.

When the rotational speed of the rotor 30 is above a predetermined threshold, the force imparted to the stator 50 by the damping fluid V is greater than that required to both overcome the biasing force of the compression spring 70 and allow the stator 50 to rotate by causing the cam followers 96 to move away from the curved apex 84*a* of the associated abutment surfaces 86 and towards one of the ends 84*a*. In this case, the arrangement of FIGS. 2 to 4 moves away from the minimal feedback torque or resistive torque condition. The overlap between vanes 36*a*, 36*b*, 64*a* and 64*b* of the rotor 30 and stator 50 in the direction of the longitudinal axis L is increased as the stator 50 is displaced axially towards the rotor 30 until the total area of shear surfaces positioned adjacent one another reaches a maximum. The amount of drag is dependent on the total area of shear surfaces positioned adjacent one another as this has an impact on the amount of shearing of the damping fluid V and therefore the feedback torque or resistive torque applied to the rotor 30, and to the steering shaft B.

Figure 5:
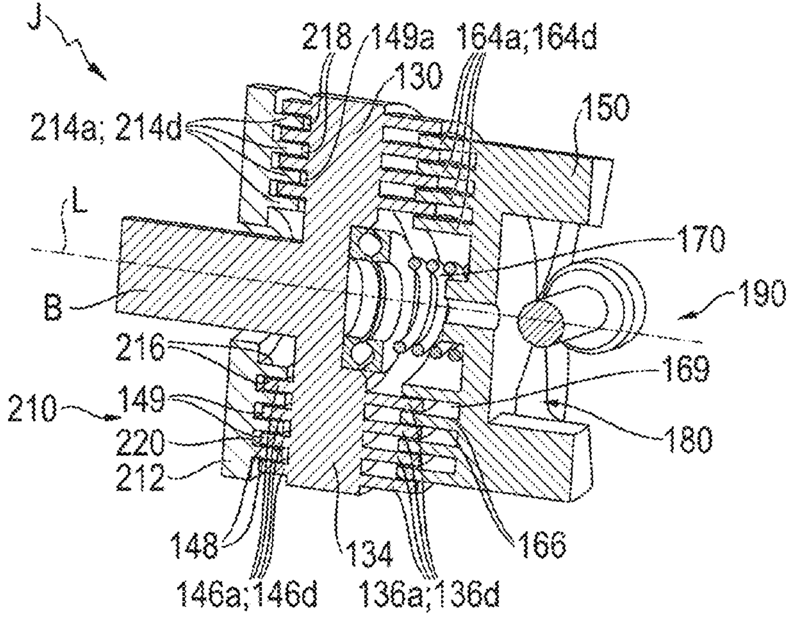
FIG. 5 is a perspective cross-sectional view of a second variant of a damper forming part of a steering assembly for a steer-by-wire vehicle in accordance with the present disclosure.

FIG. 5 is a perspective cross-sectional schematic view of a second exemplary arrangement of damper J forming part of a steering assembly 10 (FIG. 1) for a steer-by-wire vehicle in accordance with the present disclosure. The arrangement of FIG. 5 is similar to the arrangement of FIGS. 2 to 4, wherein like features are denoted by like references incremented by '100', and some detail may be omitted from FIG. 5.

The arrangement of FIG. 5 is shown in a minimal feedback torque or resistive torque condition and differs from the arrangement of FIGS. 2 to 4 in that in addition to having a stator 150, the present arrangement also includes a fixed stator 210 mounted to, and rotatably fixed relative to the housing (not shown), and for example the annular portion (not shown) thereof. As shown in FIG. 5, the fixed stator 210 is located on the opposite side of the rotor 130 from the stator 150.

The fixed stator 210 has an annular base plate 212 having a central circular aperture through which the steering shaft B passes. The base plate 212 is planar and is mounted coaxially with the longitudinal axis L of the steering shaft B. The fixed stator 210 may either be formed of a unitary annulus or ring or may instead be formed of a pair of half annuli connected together. Extending perpendicularly from inner face of the fixed base plate 212 are four annular vanes 214*a*; 214*d*. Each of the vanes 214*a*; 214*d* is mounted coaxially with the base plate 212 and extends substantially parallel to the longitudinal axis L of the steering shaft B towards the rotor 130. Furthermore, each of the vanes 214*a*; 214*d* has a rectangular cross-sectional shape.

The inner and outer walls of each of the vanes 214*a*; 214*d* form radially inner and outer annular shear surfaces 216. The end face of each of the vanes 214*a*; 214*d* also forms an annular shear surface 218. The shear surfaces 216, 218 are arranged to act with corresponding shear surfaces of the rotor 130 and the damping fluid V (FIGS. 2 to 4) to provide damping to the steering shaft B, as described in greater detail below. An annular passage 220 is also defined between the vanes 214*a*; 214*d* and has a width, defined in a radial direction, greater than the width of each of the vanes 214*a*; 214*d*.

The rotor 130 differs from the rotor 30 of the first exemplary arrangement, principally, in that there are four annular vanes 136*a*; 136*d* mounted coaxially with the base plate 134 extending from its axially inner face and that extend substantially parallel to the longitudinal axis L of the steering shaft B towards the stator 150. Additionally, a further four annular vanes 146*a*; 146*d* are mounted coaxially with the base plate 134 and extend from the axially outer face of the rotor 130 substantially parallel to the longitudinal axis L of the steering shaft B towards the fixed stator 210. Each annular vane 136*a*; 136*d* lies on the same radius as a respective vane 146*a*; 146*d*. Furthermore, each of the vanes 136*a*; 136*d* and 146*a*; 146*d* has a rectangular cross-sectional shape.

The inner and outer walls of each of the vanes 146*a*; 146*d* form radially inner and outer annular shear surfaces 148. The end face of each of the vanes 146*a*; 146*d* also forms a further annular shear surface 149. The shear surfaces 148, 149 are arranged to act with corresponding shear surfaces 216, 218 of the fixed stator 210 and the damping fluid V to provide damping to the steering shaft B, as described in greater detail below. An annular passage 149*a* is also defined between the vanes 146*a*; 146*d* and has a width, defined in a radial direction, greater than the width of each of the vanes 146*a*; 146*d*.

The vanes 146; 146*d*, 214*a*; 214*d* of the rotor 130 and the fixed stator 210 overlap fit between each other. The annular shear surfaces 148 and 216 of the rotor 130 and fixed stator 210 are positioned adjacent to but spaced apart from one another and define a gap of constant width therebetween. The arrangement of FIG. 5 differs from that of FIGS. 2 to 4 in that a greater amount of feedback torque or resistive torque is provided, even in the minimal feedback torque or resistive torque condition, when compared with the arrangement of FIGS. 2 to 4.

The stator 150 is similar to that of the arrangement of FIGS. 2 to 4, with the difference being in the number of vanes. Specifically, the stator 150 has four vanes 164*a*; 164*d*, instead of two. In a similar manner to the arrangement of FIGS. 2 to 4, the vanes 136*a*; 136*d*, 164*a*; 164*d* of the rotor 130 and stator 150 overlap fit between each other. Further, in use, moving from the minimal feedback torque or resistive torque condition to the maximum feedback torque or resistive torque condition is similar to as described above in respect of FIGS. 2 to 4 through contact between the cam arrangement 180 and cam follower arrangement 190.

Figure 6:
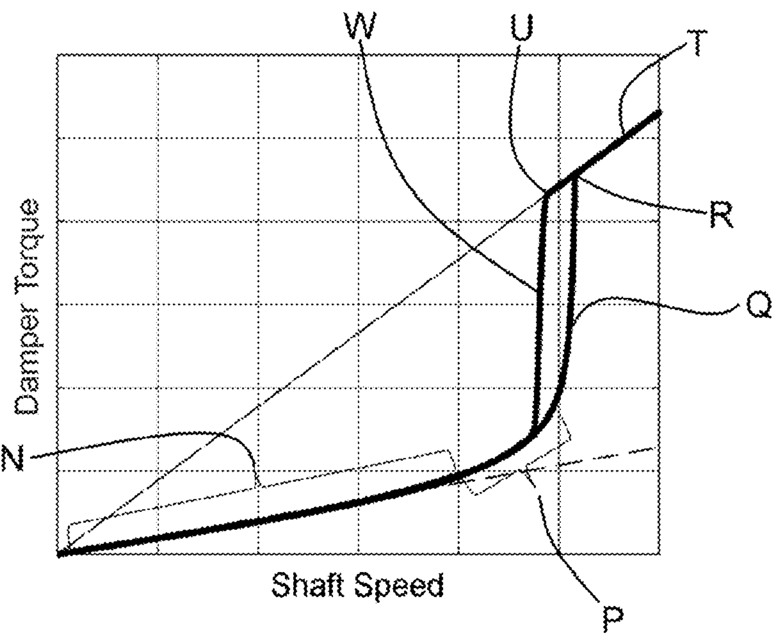
FIG. 6 is a graph depicting the relationship between steering shaft rotational speed and damping for the arrangements of FIGS. 1 to 5.

FIG. 6 illustrates the relationship between steering shaft rotational speed and damping for the arrangements of FIGS. 1 to 5, described above. In increasing shaft rotational speed from zero, there is a generally linear relationship with damping, as shown by region N of FIG. 6. During this range of steering shaft rotational speed, the force imparted to the stator 50, 150 by the damping fluid V is less than that required to both overcome the biasing force of the spring 70, 170 and allow the stator 50, 150 to rotate. Therefore, the total area of shear surfaces positioned adjacent one another is constant during this range of shaft rotational speed and the increase in damping is the result of increased shearing between the rotor 30, 130 and the damping fluid V.

As the steering shaft rotational speed is increased further, during transitional phase P, the relationship between steering shaft rotational speed and damping is no longer linear, and the rate of change of damping with increase rotational speed increases.

As the steering shaft rotational speed is increased further, during phase Q of FIG. 6, a large increase in damping is experienced with little increase in steering shaft rotational speed. During phase Q, the rotational speed of the rotor 30, 130 is above a predetermined threshold. The force imparted to the stator 50, 150 by the damping fluid V is greater than that required to overcome the biasing force of the spring 70, 170 to allow rotation of the stator 50, 150 and the stator 50, 150 is displaced axially towards the rotor 30, 130. During phase Q of FIG. 6, the overlap between the vanes of the stator 50, 150 and the vanes of the rotor 30, 130 is increased until the total area of shear surfaces positioned adjacent one another reaches a maximum at point R.

Beyond point R, the total area of shear surfaces positioned adjacent one another is constant and at a maximum. As the steering shaft rotational speed is further increased, there is a further generally linear relationship with damping, as shown by region T of FIG. 6. As with region N, during this range of shaft rotational speed and the increase in damping is the result of increased shearing between the rotor 30, 130 and the damping fluid V.

Finally, when the steering shaft rotational speed is reduced from point R, instead of following the steering shaft rotational speed against damping relationship of phase Q, there is a further reduction in steering shaft rotational speed that follows the generally linear relationship shown by region T to a steering shaft rotational speed less than that at point R. Then, at point U, a non-linear reduction in damping is experienced during phase W.

During phase W, the rotational speed of the rotor 30, 130 falls below a predetermined threshold and the force imparted to the stator 50, 150 by the damping fluid V is less than that required to overcome the biasing force of the spring 70, 170 and the stator 50, 150 moves axially away from the rotor 30, 130. During phase W of FIG. 6, the overlap between the vanes of the stator 50, 150 and the vanes of the rotor 30, 130 is reduced such that the total area of shear surfaces positioned adjacent one another is also reduced, thereby reducing the damping.

FIG. 6 shows a hysteresis in the switching point between the steering shaft rotational speed at which the total area of shear surfaces positioned adjacent one another reaches a maximum as the steering shaft rotational speed is increased, as illustrated by point R, and the steering shaft rotational speed at which the stator 50, 150 is moved axially away from the rotor 30, 130 such that the total area of shear surfaces positioned adjacent one another is reduced from the maximum as the steering shaft rotational speed is reduced, as illustrated by point U. It will be appreciated that the hysteresis is experienced as a result of residual friction and drag in the device.

Figure 7:
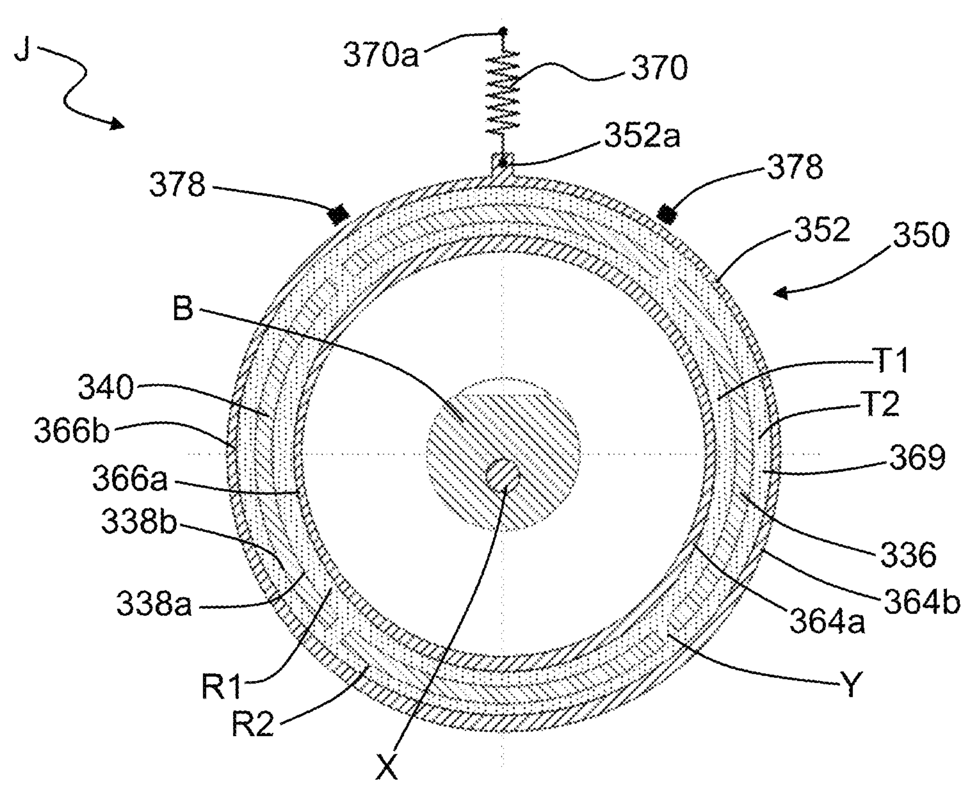
FIG. 7 is a top view of a third variant of a damper forming part of a steering assembly for a steer-by-wire vehicle in accordance with the present disclosure when the rotational speed of the steering shaft is below a threshold value.
Figure 8:
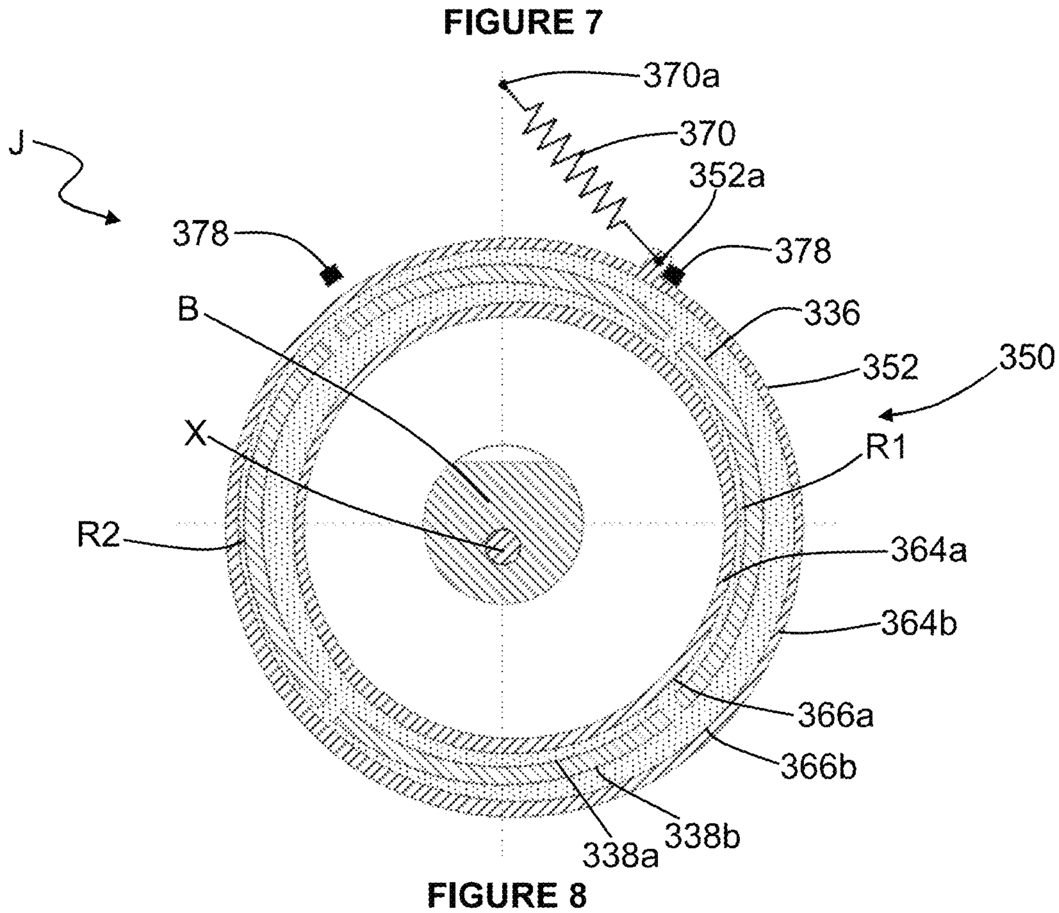
FIG. 8 is a top view of the arrangement of FIG. 7 when the rotational speed of the steering shaft is greater than a threshold value.

FIGS. 7 and 8 illustrate a damper J according to a third variant of the disclosure forming part of a steering assembly 10 (FIG. 1) for a steer-by-wire vehicle in accordance with the present disclosure. The arrangement of FIG. 5 is similar to the arrangement of FIGS. 2 to 4, wherein like features are denoted by like references incremented by '300'. The arrangement of FIG. 7 is shown in a minimal feedback torque or resistive torque condition and the arrangement of FIG. 8 is shown in a maximum feedback torque or resistive torque condition.

In the present exemplary arrangement, the rotor (not shown) is generally circular when viewed along the longitudinal axis L of the steering shaft B and has a circular base plate (not shown) that is mounted to the steering shaft B and rotatable therewith. The rotor has a single annular vane 336 arranged coaxially with the base plate and extending around the base plate proximate the periphery thereof. The vane 336 extends substantially perpendicularly from the base plate and has a pair of annular shear surfaces, namely a radially inner annular shear surface 338*a* and a radially outer annular shear surface 338*b* located radially outward of the radially inner annular shear surface 338*a*. Additionally, the end face of the vane 336 forms a further annular shear surface 340. The vane 336 of the rotor (not shown) includes four equally angularly spaced slots Y in order to provide fluid communication thereacross.

The stator 350 is also generally circular when viewed along the longitudinal axis L of the steering shaft B and has an annular base plate 352. The stator 350 is rotatable with respect to the housing (not shown) about the longitudinal axis L of the steering shaft B. The stator 350 has two annular inner and outer vanes 364*a*, 364*b* extending substantially normal from the base plate 352 and arranged coaxially with the rotational axis of the base plate 352. The stator 350 is arranged eccentrically with respect to the axis of the steering shaft B, wherein the centre of rotation X of the stator 350 is shown offset from the centre of rotation of the steering shaft B. Further, the vanes 364*a*, 364*b* of the stator 350 extend parallel with and are radially offset from one another so as to define an annular passage 369 therebetween. The inner face of the outer vane 364*b* forms a radially outer annular shear surface 366*b* and the outer face of the inner vane 364*a* forms a radially inner annular shear surface 366*a*. The annular shear surfaces 366*a*, 366*b* are opposed to and face one another and define the passage 369 between them. Each of the vanes 336, 364*a* and 364*b* has a constant thickness.

A spring 370 is connected at one end to a lug 352*a* on the annular base plate 352 of the stator 350, proximate the twelve o'clock position when viewed along the longitudinal axis L of the steering shaft B and when the damper J is in the minimal feedback torque or resistive torque condition. The spring 370 is connected at its other end to a point 370*a* fixed relative to the housing (not shown) and is arranged to bias the stator 350 towards the position shown in FIG. 7. A pair of end stops 378 are located either side of the lug 352*a* and are also fixed relative to the housing (not shown) and are provided to limit the extent to which the stator 350 is allowed to rotate in either direction.

The rotor and the stator 350 are brought together such that the annular vane 336 of the rotor is received within the passage 369 of the stator 350 and thereby splitting the passage 369 into two annular chambers T1, T2. A first chamber T1 is located radially inwards of a second chamber T2 and each chamber will contain damping fluid V, in use. When the steering shaft B is in the straight ahead position, the vane 336 of the rotor 330 is coaxial with respect to the annular passage 369 of the stator 350 (i.e. there is a constant spacing between the annular shear surfaces 366*a*, 366*b* of the stator 350 and the annular shear surfaces 338*a*, 338*b* of the rotor 330). In that position, the gap R1 defined between the annular shear surfaces 338*a* and 366*a* and the gap R2 defined between the annular shear surfaces 338*b* and 366*b* are each substantially constant around the annular passage 369. In this position, the total area of shear surfaces 338*a*, 338*b*, 366*a*, 366*b* positioned adjacent one another is at a minimum and the damper J is in the minimal feedback torque or resistive torque condition.

In use, as the rotor 330 is rotated with the steering shaft B, the damping fluid V located proximate the shear surfaces 338*a*, 338*b* is sheared and is moved or displaced relative to the stator 350. Due to its viscosity, the moving damping fluid V imparts a force to the stator 350 and as the rotational speed of the rotor 330 is increased, the force imparted to the stator 350 by the damping fluid V is increased. However, in order to impart rotation of the stator 350 relative to rotor 330, the force applied to the stator 350 must be sufficient to overcome the biasing force of the spring 370. Whilst the rotational speed of the rotor 330 is below a predetermined threshold, the force imparted to the stator 350 by the damping fluid V is less than that required to overcome the biasing force of the spring 370 and thereby cause the stator 350 to rotate.

However, as shown in FIG. 8, when the rotational speed of the rotor 330 is above a predetermined threshold, the force imparted to the stator 350 by the damping fluid V is greater than that required to overcome the biasing force of the spring 370 and allow the stator 350 to rotate. In this case, the arrangement of FIG. 7 moves away from the minimal feedback torque or resistive torque condition towards the maximum feedback torque or resistive torque condition of FIG. 8. In the case of FIG. 8, both the rotor 330 and the stator 350 are rotated in a clockwise direction, but it will also be appreciated that the effect will be achieved when rotated in an anti-clockwise direction.

Due to the eccentrically mounted stator 350, as it is rotated the annular vanes 364*a*, 364*b* both rotate and translate in the radial direction relative to the rotor 330 and the rotor vane 336. In particular, the radially inner annular shear surface 366*a* of the stator 350 translates towards the radially inner annular shear surface 338*a* of the vane 336 on one side, and at a diametrically opposite side the radially outer annular shear surface 366*b* of the stator 350 translates towards the radially outer annular shear surface 338*b* of the vane 336. The effect is that the gaps R1, R2 are reduced and the distance between the shear surfaces 338*a*, 338*b*, 366*a*, 366*b* positioned adjacent one another is reduced to a minimum. Further, as the gaps R1, R2 are reduced, the total area of the shear surfaces 338*a*, 338*b*, 366*a*, 366*b* positioned adjacent one another is increased to a maximum. The extent of rotation of the stator 350 is limited when the lug 352*a* abuts the rightmost end stop 378.

The amount of drag on the rotor 330, and therefore steering shaft B, is dependent on the inverse of the separation distance between the shear surfaces positioned adjacent one another as this has an impact on the amount of shearing of the damping fluid V and therefore the feedback torque or resistive torque applied to the rotor 330. The amount of drag on the rotor 330, and therefore the steering shaft B, is also affected by the total area of the shear surfaces positioned adjacent one another, as this also has an impact on the amount of shearing of the damping fluid V. As a result, the feedback torque or resistive torque steadily increases to a maximum as the stator 350 is moved from the position of FIG. 7 to the position of FIG. 8.

Figure 9:
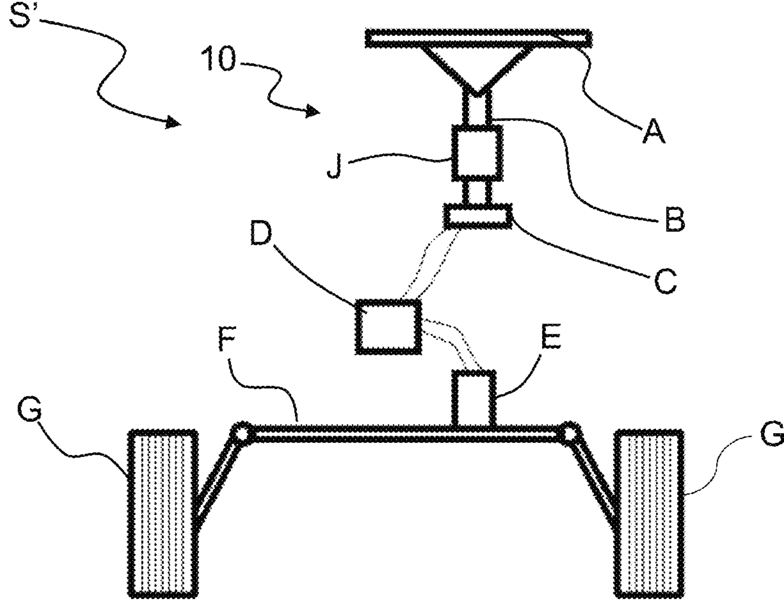
FIG. 9 is a schematic illustration of a further variant of a steer-by-wire steering system in accordance with the present disclosure.

FIG. 9 illustrates an alternative exemplary arrangement of a steer-by-wire system S for a vehicle incorporating a steering assembly 10 in accordance with the present disclosure. The steer-by-wire system S' is similar to the steer-by-wire system S, and like features are denoted by like references. The steer-by-wire system S' of FIG. 30 differs from the steer-by-wire system S of FIG. 1 in that in the present exemplary arrangement there is no torque feedback motor H. Instead, the feedback torque provided to the steering wheel A is provided via the damper J. It will be appreciated that any of the dampers J disclosed in FIGS. 2 to 8, described above, may be incorporated into a steering assembly 10 according to FIG. 9, i.e. in the absence of a torque feedback motor H.

It will be appreciated by those skilled in the art that several variations to the aforementioned arrangements are envisaged without departing from the scope of the disclosure.

It will also be appreciated by those skilled in the art that any number of combinations of the aforementioned features and/or those shown in the appended drawings provide clear advantages over the prior art and are therefore within the scope of the disclosure described herein.

The invention claimed is:

1. A steering assembly for a steer-by-wire vehicle, comprising:
- a rotatably mounted elongate steering column configured for attachment of a steering member at one end, the steering column being rotatable about its longitudinal axis in either direction from a straight ahead position;
- a damper comprising:
- a housing defining a volume for receipt of damping fluid;
- a rotor within the housing, the rotor being coupled with the steering column and rotatable therewith;
- a stator mounted within the housing, the stator being moveable within the housing within a defined range of movement; and
- a biasing member acting on the stator;
- wherein each of the stator and rotor comprises a shear surface, the shear surfaces of the stator and the rotor being positioned adjacent one another to generate a resistance to rotation of the rotor when the housing contains damping fluid; and
- a total surface area of the shear surfaces of the stator and the rotor positioned adjacent one another which generates the resistance to rotation of the rotor varies as the steering column is rotated from the straight ahead position by virtue of displacement of the stator relative to the rotor.

2. The steering assembly according to claim 1, wherein the total surface area of the shear surfaces of the stator and the rotor positioned adjacent one another is increased or decreased as the steering column is rotated from the straight ahead position.

3. The steering assembly according to claim 1, wherein the stator is rotatable about the longitudinal axis of the steering column and is configured to be displaced against the biasing member axially towards the rotor as it is rotated.

4. The steering assembly according to claim 1, wherein stator is rotatable within the housing, and the stator and rotor are coupled by the damping fluid, such that the stator is rotated relative to the housing when the steering column is rotated at a speed greater than a predetermined threshold.

5. The steering assembly according to claim 1, wherein the stator comprises a cam, and the steering assembly comprises a cam follower fixed relative to the housing, and wherein the cam and cam follower are arranged so as to displace the stator axially towards the rotor against the biasing member as the cam follower is moved along the cam.

6. The steering assembly according to claim 5, wherein the cam is configured to rotate with the stator and comprises a cam surface, wherein a position of the cam surface along the longitudinal axis varies along the length of the cam.

7. The steering assembly according to claim 5, wherein the cam is arcuate or part-annular.

8. The steering assembly according to claim 7, wherein the cam is coaxial with the longitudinal axis of the steering column.

9. The steering assembly according to any one of claim 5, wherein the cam and cam follower are arranged such that the cam follower is moved along the cam and the stator is displaced axially towards the rotor against the biasing member as the stator is rotated relative to the housing.

10. The steering assembly according to any one of claim 5, wherein the biasing member is located between the stator and the rotor and is arranged so as to bias the cam into contact with the cam follower.

11. The steering assembly according to claim 1, wherein the biasing member comprises a compression spring configured to bias the stator away from the rotor.

12. The steering assembly according to claim 10, wherein the biasing force increases as the stator is displaced axially towards the rotor.

13. The steering assembly according claim 5, wherein the cam and the cam follower are arranged so as to displace the stator axially towards the rotor against the biasing member when the rotational speed of the steering column exceeds a predetermined threshold.

14. The steering assembly according to claim 1, wherein the biasing member is located between the stator and the housing.

15. The steering assembly according to claim 1, wherein the stator and the rotor each comprise a respective elongate projection extending therefrom, and wherein each elongate projection comprises a respective shear surface.

16. The steering assembly according to claim 15, wherein the elongate projection of the stator extends towards the rotor and the elongate projection of the rotor extends towards the stator.

17. The steering assembly according to claim 15, wherein each elongate projection is arcuate and at least one shear surface of each elongate projection comprises an annular shear surface, and the total area of annular shear surfaces positioned adjacent one another is increased as the steering column is rotated from the straight ahead position.

18. The steering assembly according to claim 17, wherein the total area of annular shear surfaces positioned adjacent one another is increased as the stator is displaced against the biasing member axially towards the rotor.

19. A steering assembly according to claim 1, wherein the stator and the rotor each comprise a plurality of radially spaced elongate projections and one or more passages described between adjacent elongate projections, wherein an elongate projection of the stator is configured to be received within a passage of the rotor and an elongate projection of the rotor is configured to be received within a passage of the stator.

20. The steering assembly according to claim 19, wherein the amount by which the elongate projections of the stator axially overlap the elongate projections of the rotor is increased as the stator is displaced against the biasing member axially towards the rotor, thereby increasing the total surface area of the shear surfaces positioned adjacent one another.

21. The steering assembly according to claim 1, wherein the shear surface of each of the stator and the rotor are planar.

22. The steering assembly according to claim 21, wherein the shear surface of the stator is spaced from the shear surface of the rotor along the longitudinal axis of the steering column.

23. The steering assembly according to claim 22, wherein the shear surface of the stator is configured to be displaced axially against the biasing member towards the shear surface of the rotor.

24. The steering assembly according to claim 21, wherein the shear surfaces overlap when viewed along the longitudinal axis of the steering assembly.

25. The steering assembly according to claim 1, wherein the stator is rotatable within the housing and mounted eccentrically.

26. A steering assembly according to claim 15, wherein the stator is rotatable within the housing and mounted eccentrically and the rotor is arranged such that spacing between the shear surface of the elongate projection of the stator and the shear surface of the elongate projection of the rotor varies as the steering column is rotated from the straight ahead position.

27. The steering assembly according to claim 26, wherein stator is rotatable within the housing, and the stator and rotor are coupled by the damping fluid, such that the stator is rotated when the steering column is rotated at a speed greater than a predetermined threshold.

28. The steering assembly according to claim 27, wherein the spacing between the shear surfaces is reduced as the stator is rotated thereby increasing the total surface area of the shear surfaces positioned adjacent one another.

29. The steering assembly according to claim 25, wherein the biasing member is configured to bias the stator towards the straight ahead position.

30. The steering assembly according to claim 1, comprising a pair of circumferentially spaced end stops configured to limit the extent of rotation of the stator, wherein the stops are positioned either side of the straight ahead position.

31. A steering column assembly comprising the steering assembly as claimed in claim 1.

32. A vehicle comprising the steering assembly as claimed in claim 1.

* * * * *